Figure 1:
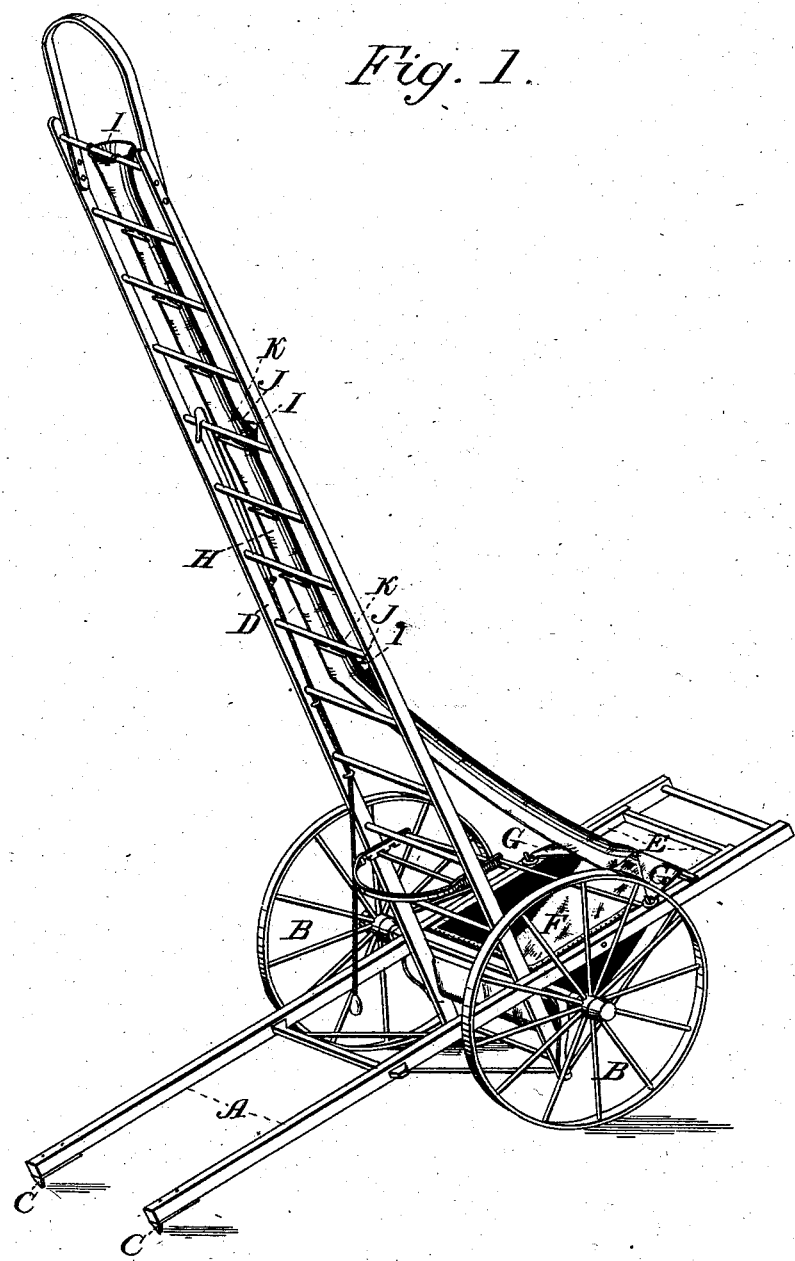

(No Model.) 2 Sheets—Sheet 1.

L. H. TITUS.

PORTABLE LADDER FOR GATHERING FRUIT.

No. 289,942. Patented Dec. 11, 1883.

Witnesses,
Geo. H. Strong.

Inventor,
L. H. Titus
By Dewey & Co.
Attorneys (No Model.)  2 Sheets—Sheet 2.
L. H. TITUS.
PORTABLE LADDER FOR GATHERING FRUIT.
No. 289,942.  Patented Dec. 11, 1883.
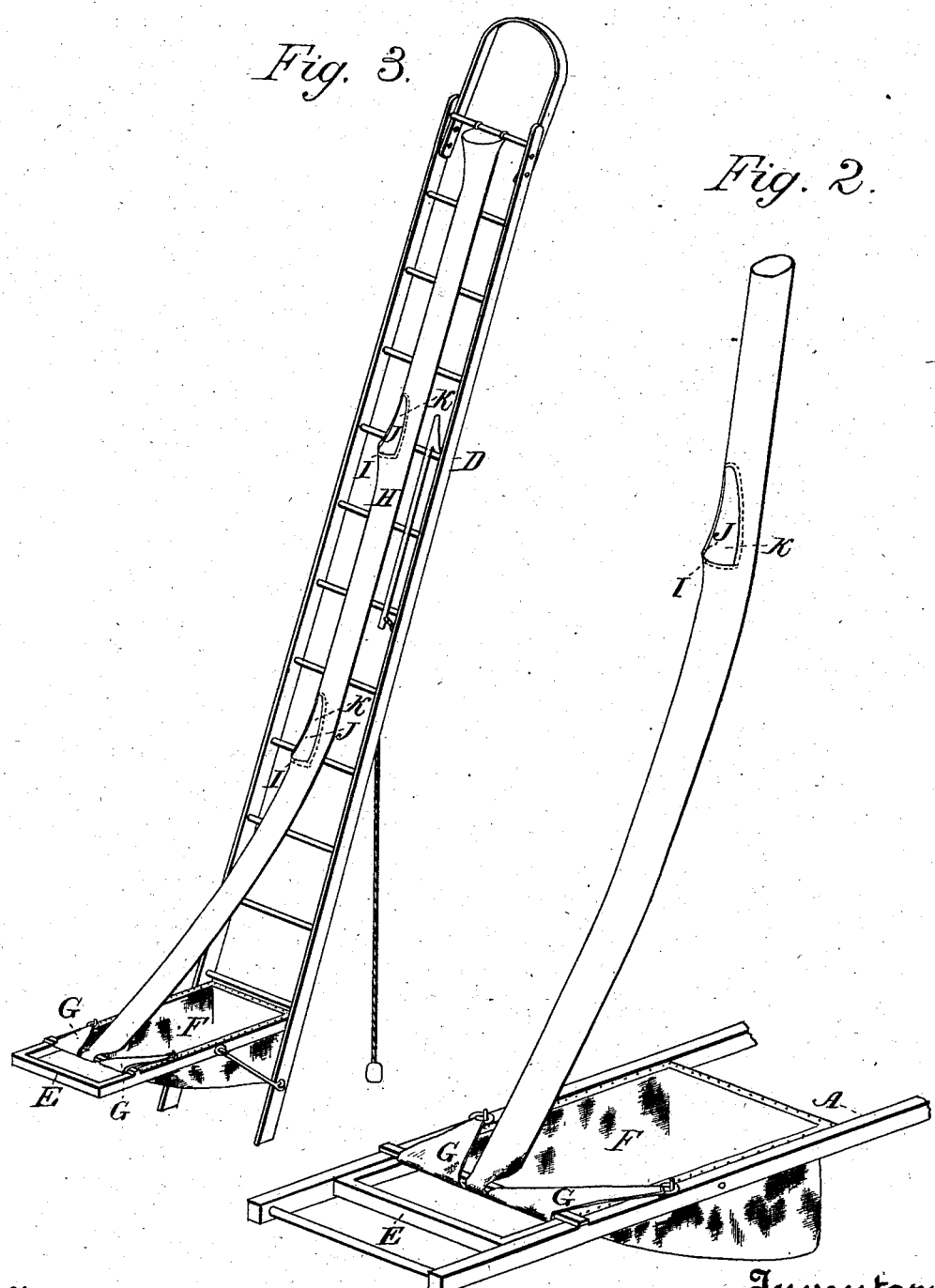

UNITED STATES PATENT OFFICE.

LUTHER H. TITUS, OF SAN GABRIEL, CALIFORNIA.

PORTABLE LADDER FOR GATHERING FRUIT.

SPECIFICATION forming part of Letters Patent No. 289,942, dated December 11, 1883.

Application filed September 25, 1883. (No model.)

*To all whom it may concern:*

Be it known that I, LUTHER H. TITUS, of San Gabriel, county of Los Angeles, and State of California, have invented an Improvement in Portable Ladders for Gathering Fruit; and I hereby declare the following to be a full, clear, and exact description thereof.

My invention relates to certain improvements in apparatus for gathering fruit from trees; and it consists of a horizontal frame supported midway upon wheels, and having anchors at the end by which it is held in place, a ladder pivoted to hangers below the frame and extending in an inclined direction upward, and a flexible tube or chute with openings at intervals, through which the fruit may be introduced into it, together with a peculiar receiving-bag upon the frame, into which the fruit passes, and from which it may be discharged at intervals by tilting it, all of which will be more fully explained by reference to the accompanying drawings, in which—

Figure 1 is a view of my device. Fig. 2 is an enlarged view of the lower part of the tube and the receiver. Fig. 3 is a perspective view of a modification of my device.

In my present invention, (which is an improvement upon one patented to me November 19, 1878,) A is a frame supported upon the axle of two wheels, B, and having anchors C at its ends, which may be fixed in the ground to hold the apparatus in place. D is a ladder supported from hangers below the axle, and extending upward at an inclination, so that it may be ascended by the operator. Between the sides of the frame A is a supplemental frame, E, pivoted so as to turn upon its pivots when desired. A sack or flexible receiver, F, has its edges secured to the sides and back rail of this frame, and its front portion is split so as to leave two tongues, G G, that may be brought around a cross-bar and fastened to complete the sack, holding its bottom on an incline, so that the fruit received into it may roll gently down to its lowest end. A flexible tube, H, of small diameter, extends up along the ladder, by which it is supported, and has a flaring mouth at the top. At intervals in its length it has hoops I, which keep it open, and slits or openings J, through which fruit may be introduced into its interior. Small flexible diaphragms K extend downward from these openings far enough to prevent the fruit passing from above from interfering with that which may be introduced at any point below. The mouth of this tube opens into the shallow front part of the receiver F, and the fruit discharged therefrom rolls gently down to the lowest point, where it accumulates until it is necessary to discharge it. This is done by unfastening the flexible tongues or strips G and letting them fall downward. The frame E is now tilted, so that the fruit rolls out through the slit between the two tongues, and falls into the basket or receptacle below, after which the parts may be rearranged for more work. By this construction I am enabled to gather fruit rapidly, with no danger of bruising it and rendering it bad looking or unsalable. In some cases the frame and wheels may be omitted and the flexible chute attached to the ladder, and the receiver or apron, which may be made of canvas, is buttoned or otherwise fixed to the sides of the ladder at a short distance from the ground, so that its outer end sweeps away from the ladder in a curve. The end of the tube opens into the upper part of the elastic concave incline thus formed, which thus receives the descending fruit and carries it away, depositing it easily upon the ground or in a receptacle.

When the ladder is to be moved, the apron is simply folded up against the ladder and secured.

Having thus described my invention, what I claim as new, and desire to secure by Letters Patent, is—

1. In a fruit-gatherer, the horizontally-supported frame A and anchors C, the inclined ladder D, supported upon hangers, flexible tube H, extending along said ladder, and provided with hoops I, slits J, and diaphragm K at suitable intervals, supplemental pivoted frame E, adapted to tilt between the sides of the main frame, and having secured to it a flexible receiver, F, extending outward and downward from its foot, with a split portion, forming tongues G G, substantially as shown and described.

2. In a fruit-gatherer, the horizontal frame A and inclined ladder D, mounted upon wheels, in combination with a flexible tube, H, extending along the ladder, and having hoops I, slits J, and diaphragm K at intervals in its length, substantially as shown and described.

3. In combination with a fruit-gatherer consisting of the inclined ladder D, flexible tube H, provided at intervals with the hoop I, slits J, and diaphragm K, the flexible receiver F, secured to a supplemental pivoted frame, E, and having tongues G G, all substantially as shown and described.

In witness whereof I have hereunto set my hand.

LUTHER H. TITUS.

Witnesses:
S. H. NOURSE,
H. C. LEE.